Patented Dec. 9, 1941

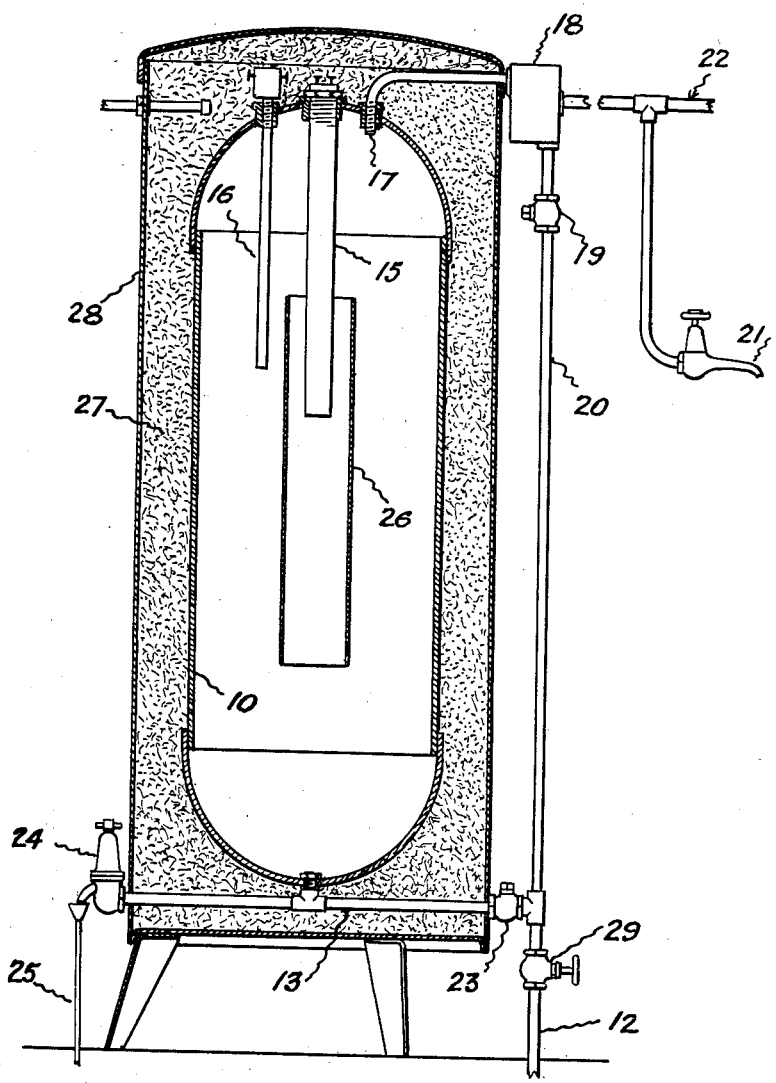

2,265,969

UNITED STATES PATENT OFFICE 2,265,969

ELECTRIC STORAGE WATER HEATER

David Black Knox, Redfern, near Sydney, New South Wales, and Walter Lorenzo Walters, Coogee, near Sydney, New South Wales, Australia Application August 9, 1940, Serial No. 352,024
In Australia August 9, 1939

8 Claims. (Cl. 219—39)

This invention relates to improvements in storage water heaters and, particularly, to storage water heaters of the type wherein a quantity of water in a storage tank is heated electrically from a power supply system during the off-peak load period and is available continuously for use.

In known practice storage tanks are proportioned to hold a quantity of water which, when heated to a temperature of about 150 degrees F., is sufficient to supply the hot water requirements of an establishment for the whole day. In order to hold the increased quantities of water now called for in private houses, flats and other establishments, the storage tanks required are often inconveniently large and, when it is desired to install such tanks in buildings already erected, it frequently becomes necessary to cut open the roof in order to suitably dispose the tank. Again, inconvenience arises in the servicing of tanks when so disposed. Furthermore, in tanks of the known type, in which heating takes place during the off-peak load period, the temperature of the water in the tank is progressively reduced, as water is drawn from the tank, by replenishment with unheated water from the main.

An object of the present invention is to provide a storage water heater in which, without sacrifice of heat storage capacity, the outside dimensions of the storage tank are substantially reduced, thus enabling the heater to be readily transported through house doors and conveniently positioned in a room. A further object of the invention is to provide an off-peak storage heater in which the greater part of the water passing to the reticulation system is maintained at a predetermined reticulation temperature whilst the remainder of the water drawn off from the storage tank undergoes progressive diminution in temperature by admixture with replenishment unheated water in the storage tank. A still further object is to provide, in an electrically heated off-peak water storage tank operating under pressure, means to obviate damage to the apparatus through overheating and/or the development of excess pressure as, for example, when a controlling thermostat for electrical heating units fails to operate at a predetermined temperature.

In accordance with the present invention water from the mains is supplied to a storage water tank wherein it is maintained at a pressure exceeding that of the atmosphere and, preferably, at the pressure at which it is supplied from the mains; the said water is heated to a temperature above that of the atmospheric boiling point of water and, when drawn from the tank, passed to a mixing valve or chamber where it is attemperated with unheated water supplied through a bye-pass from the main, and thereafter passed from the mixing valve or chamber to the reticulation system for use.

Water under pressure is supplied to the storage heater from the main practically filling the storage tank, mixing chamber and reticulation system. The water in the storage tank is heated by electrical means controlled by a thermostat which is responsive to a predetermined temperature. A pressure relief valve is connected to the storage tank to permit escape of water should the pressure exceed a predetermined degree through any cause such as through undue thermal expansion of stored water or by the formation of steam in the event of failure of the thermostat to function at a set temperature. Non-return valves are placed in the connections to the water main.

In the accompanying drawing, which illustrates an approved form of the invention, 10 is a storage tank adapted to be filled, through a pipe 13, with water from a main pipe 12. A heating element 15, located within the storage tank 10, is controlled by a thermostat 16. The heated water outlet 17 leads from the storage tank 10 to a mixing valve or chamber 18. An extension 20, of the main pipe 12, leads to the mixing valve 18. The reticulation system 22 extends from the mixing valve 18 and is provided with draw-off points 21 as desired. 19 and 23 are non-return valves placed in the supply pipes 20 and 13 respectively and 29 is a main cock. A relief valve 24, exposed to the pressure of water in the storage tank 10, discharges to a drain 25. A circulation guide tube 26 may be located around the heating element 15. The storage tank 10 is surrounded by heat insulating material 27 retained within a casing 28.

In operation heat is applied by the element 15, the system firstly having been filled with water from the main under pressure; as the water expands, due to its temperature rise, the excess volume is automatically removed through the relief valve 24. When the temperature of the water has reached a predetermined limit, the thermostat 16 comes into operation to cut off the heat supply. Upon the opening of any drawing-off point 21 heated water passes out of the storage tank 10 through the pipe 17 to the mixing valve 18 and there mixes with unheated water, delivered from the main through the pipe 20, whereby the temperature of the mixture is adjusted to the reticulation temperature. At the same time unheated water enters the storage tank 10 through the pipe 13 to replenish the tank which is always kept substantially full. When the draw-off point 21 is reclosed further flow through the system is prevented.

The operation of the invention may be explained by the following example wherein a storage tank holding twelve gallons of water is supplied with water from the mains at a temperature of 60 degrees F. and at a pressure of fifty pounds to the square inch, the reticulation temperature being 150 degrees F. Under these conditions water in the storage tank may be raised to a temperature of 280 degrees F. without the formation of steam therein; this excess of heat over 150 degrees F. is used, when the heated water is mixed in the mixing valve or chamber with unheated water, supplied from the mains at 60 degrees F., to provide a further seventeen gallons of water at the reticulation temperature of 150 degrees F. At this stage the storage tank will be full of water at 150 degrees F. and further water drawn from the system will be subject to a diminishing temperature. In this case the thermostat would be adjusted to cut off the heat supply when the water in the tank reached a temperature of 280 degrees F. whilst the relief valve would be adjusted to release pressure above fifty pounds to the square inch. There would therefore be seventeen gallons of water at 150 degrees F. passed to the reticulation, portion of which will have entered the storage tank to reduce the internal temperature to 150 degrees F. and further water drawn off would be subject to a diminishing temperature.

The invention is not limited to heating the water in the storage tank to a temperature corresponding to the boiling point of the water under the pressure in the mains supply and any other suitable conditions of temperature and pressure may be chosen. It is desirable, however, that steam should not be raised to any marked extent in the storage tank and that the water discharged from the mixing valve to the reticulation system should be below the atmospheric boiling point.

Where the pressure in the water supply mains is relatively low, the water in the storage tank may be raised by heating to a pressure in excess of that in the supply mains, and to a corresponding temperature, the thermostat and relief valve being adjusted accordingly. In this case the first portion of the water drawn off through the mixing valve is not immediately replaced by fresh water from the supply main until the pressure in the storage tank has been sufficiently reduced to permit its entry. The amounts of water and evolved steam involved in this initial discharge are relatively small.

When the apparatus is adapted to be heated electrically from a power supply system during the off-peak load period under control of a time switch it is so arranged that, in the event of the thermostat failing to cut off current from the heating element, the consequent formation of steam within the storage tank will result in water being forced out through the relief valve until the heating element is uncovered and steam formation thus discontinued; the internal pressure is thus lowered and unheated water from the main enters the tank. In view of the low wattage involved there will not be any damage to the heating element. When the time clock cuts off the current unheated water will enter to fill the tank with the result that the water in the tank will not be sufficiently heated for use, a fact which will call attention to the defect. The thermostat is not prevented from functioning normally should the relief valve not operate.

It is important to state that the present invention enables hot water to be fed to the various points of distribution at full mains pressure or at other selected pressures. Storage water heaters which are heated during an off-peak period, as heretofore used, by reason of their principle of operation, have distributed hot water at a pressure dependent entirely upon the head or height of the storage heater above the points of distribution whereby such hot water has been delivered at a comparatively low pressure. For example, in the case of a single story building, the pressure due to height is rarely more than from three to five pounds to the square inch. A number of resultant disadvantages follow from the low distribution pressures heretofore achieved. For instance, comparatively large diameter hot water reticulation piping has been required and this is costly both in itself and in its installation, requiring considerable labour in cutting and fitting of pipe bends and joints, such as tees, elbows and so forth. Again, when large diameter piping is employed a comparatively large volume of water is always in the pipes which water is cooling off continuously when the pipes are not in service thus leading to appreciable heat losses in the system. In the present invention, where hot water can be supplied at full mains, or other selected, pressure, a small bore reticulation tubing, preferably of copper may be employed; such tubing, even with relatively thick walls, may be bent readily so that its installation may be made with a minimum of labour and of the fittings required in the installation of usual reticulation piping. Furthermore, by employing smaller bore tubing, the volume of water in the reticulation system is considerably reduced with the result that heat losses are materially minimised.

The invention has hereinbefore been described with particular reference to electrical heating of water in the storage tank but it will be obvious that other heating means may be employed in order to achieve a similar thermal result.

We claim:

1. The method of providing a supply of attemperated water which consists in heating water freely entering and substantially filling a closed storage water vessel whilst contained therein to a temperature above the atmospheric boiling point of water, containing the water in the said storage vessel at a pressure exceeding that of the atmosphere limiting the aforesaid temperature and pressure to a predetermined higher level by means of a thermostat submerged in the water, controlling excess water pressure in the storage vessel by a relief valve passing heated water under pressure to an enclosed mixing chamber connected to the storage vessel admixing unheated water from a water supply with the heated water in the mixing chamber whereby the heated water is attemperated and thence passing the thus attemperated water at a pressure above atmospheric pressure for use.

2. The method of providing a supply of attemperated water which consists in heating water freely entering and substantially filling a closed storage water vessel whilst contained therein to a temperature above the atmospheric boiling point of water by means of an electric element connected during the off-peak period to a power supply system, containing the water in the said storage vessel at a pressure exceeding that of the atmosphere limiting the aforesaid temperature and pressure to a predetermined higher level by means of a thermostat submerged in the water, controlling excess water pressure in the storage vessel by a relief valve passing heated water under pressure to an enclosed mixing chamber connected to the storage vessel admixing unheated water from a water supply with the heated water in the mixing chamber whereby the heated water is attemperated and thence passing the thus attemperated water at a pressure above atmospheric pressure for use.

3. The method of providing a supply of attemperated water which consists in heating water freely entering and substantially filling a closed storage water vessel whilst contained therein to a temperature above the atmospheric boiling point of water, containing the water in the said storage vessel at a pressure exceeding that of the atmosphere limiting the aforesaid temperature and pressure to a predetermined higher level by means of a thermostat submerged in the water, controlling excess water pressure in the storage vessel by a relief valve passing heated water under pressure to an enclosed mixing chamber connected to the storage vessel admixing unheated water admitted through a non-return valve from a water supply with the heated water in the mixing chamber whereby the heated water is attemperated and thence passing the thus attemperated water at a pressure above atmospheric pressure for use.

4. The method of providing a supply of attemperated water which consists in heating water freely entering and substantially filling a closed storage water vessel whilst contained therein to a temperature above the atmospheric boiling point of water, containing the water in the said storage vessel at a pressure exceeding that of the atmosphere limiting the aforesaid temperature and pressure to a predetermined higher level by means of a thermostat submerged in the water, controlling excess water pressure in the storage vessel by a relief valve passing heated water under pressure to an enclosed mixing chamber connected to the storage vessel admixing unheated water from a water supply with the heated water in the mixing chamber whereby the heated water is attemperated and thence passing the thus attemperated water at a pressure above atmospheric pressure for use characterised in that a predetermined amount of water is delivered for use at a substantially constant temperature and that further amounts of heated water drawn from the storage vessel and admixed with unheated water in the mixing chamber are delivered for use at a progressively diminishing temperature.

5. The method of providing a supply of attemperated water which consists in heating water freely entering and substantially filling a closed storage water vessel whilst contained therein to a temperature above the atmospheric boiling point of water, containing the water in the said storage vessel at a pressure exceeding that of the atmosphere limiting the aforesaid temperature and pressure to a predetermined higher level by means of a thermostat submerged in the water, controlling excess water pressure in the storage vessel by a relief valve passing heated water under pressure to an enclosed mixing chamber connected to the storage vessel admixing unheated water from a water supply with the heated water in the mixing chamber whereby the heated water is attemperated and thence passing the thus attemperated water at a pressure above atmospheric pressure for use characterised in that in the event of failure of the thermostat to open the heating element circuit at the upper temperature limit the water pressure rises in the storage vessel with the evolution of steam whereupon water is caused to be discharged from the storage vessel through the relief valve until the water level has fallen below the heating element and heating thereby ceases until the water level is automatically raised.

6. A storage water heater comprising a pressure vessel, pipe attachment means to allow unheated water to be supplied to the said vessel at a pressure above that of the atmosphere, means adapted to heat water contained in the vessel to a temperature above the atmospheric boiling point of water, a thermostat in the pressure vessel to govern a predetermined upper limit of temperature a relief valve in the pressure vessel operable when a predetermined pressure is reached and operable when the thermostat fails to operate a mixing chamber connected to the pressure vessel pipe attachment means to allow unheated water to be supplied to the mixing chamber and an outlet in the mixing chamber for connection to a reticulation system.

7. A storage water heater comprising a pressure vessel, pipe attachment means to allow unheated water to be supplied to the said vessel at a pressure above that of the atmosphere, means adapted to heat water contained in the vessel to a temperature above the atmospheric boiling point of water, a thermostat in the pressure vessel to govern a predetermined upper limit of temperature a relief valve in the pressure vessel operable when a predetermined pressure is reached and operable when the thermostat fails to operate a mixing chamber connected to the pressure vessel pipe attachment means to allow unheated water to be supplied to the mixing chamber non-return valves in the unheated water supply pipes to the pressure vessel and mixing chamber and an outlet in the mixing chamber for connection to a reticulation system.

8. A storage water heater comprising a pressure vessel, pipe attachment means to allow unheated water to be supplied to the said vessel at a pressure above that of the atmosphere means adapted to heat water contained in the vessel to a temperature above the atmospheric boiling point of water said means being placed in the pressure vessel so as to become uncovered upon substantial depression of the surface level of water therein a thermostat in the pressure vessel to govern a predetermined upper limit of temperature a relief valve in the pressure vessel operable when a predetermined pressure is reached and operable when the thermostat fails to operate said relief valve located below the heating element in the pressure vessel a mixing chamber connected to the pressure vessel pipe attachment means to allow unheated water to be supplied to the mixing chamber and an outlet in the mixing chamber for connection to a reticulation system.

DAVID BLACK KNOX.
WALTER LORENZO WALTERS.